United States Patent [19]

Sato et al.

[11] 4,314,284
[45] Feb. 2, 1982

[54] VIDEO HEAD DEFLECTION APPARATUS FOR SPECIAL MOTION REPRODUCTION BY HELICAL SCAN VTR

[75] Inventors: Yoshihiko Sato; Tatsuo Konishi, both of Tokyo, Japan

[73] Assignee: Nippon Electric Co., Ltd., Tokyo, Japan

[21] Appl. No.: 91,195

[22] Filed: Nov. 7, 1979

[30] Foreign Application Priority Data

Nov. 7, 1978 [JP] Japan .................... 53-136953

[51] Int. Cl.³ .................... G11B 21/18; G11B 21/10
[52] U.S. Cl. .................... 360/10; 360/107
[58] Field of Search .................... 360/9, 10, 11, 75, 77, 360/78, 70, 109, 106, 107; 179/100.3 V, 100.1 G

[56] References Cited

U.S. PATENT DOCUMENTS

| 4,030,133 | 6/1977 | Yamada et al. | 360/107 X |
| 4,151,569 | 4/1979 | Hathaway | 360/77 |
| 4,152,727 | 5/1979 | Tatsuguchi et al. | 360/77 X |
| 4,167,762 | 9/1979 | Hashizaki et al. | 360/77 |
| 4,183,059 | 1/1980 | Palmer | 179/100.3 V |

FOREIGN PATENT DOCUMENTS 52-43362 of 1977 Japan .................... 360/77

*Primary Examiner*—James W. Moffitt
*Assistant Examiner*—Donald McElheny, Jr.
*Attorney, Agent, or Firm*—Hopgood, Calimafde, Kalil, Blaustein & Judlowe

[57] ABSTRACT

An improved video head deflection apparatus for special speed motion reproduction by a helical scan video tape recorder. The rotary head of the recorder is mounted so that it is displaceable in a direction perpendicular to its path of rotation. The deflection apparatus includes a coil assembly and a magnetic element, one of which is fixedly mounted, the other of which is mounted to the rotating head. The coil and magnetic element are used to deflect the head when the coil is electrically energized.

7 Claims, 7 Drawing Figures

VIDEO HEAD DEFLECTION APPARATUS FOR SPECIAL MOTION REPRODUCTION BY HELICAL SCAN VTR

BACKGROUND OF THE INVENTION

This invention relates to a special motion reproduction system for producing special-motion effects, such as slow motion, quick motion, still motion and other effects, in television video signals reproduced by a helical-scan video tape recorder player (VTR) while a magnetic tape is transported at a tape speed different from the recording tape speed, and more particularly to a video head deflection apparatus therefor.

Several systems have been proposed to record and/or reproduce television video signals on a magnetic tape. One of them is a helical-scan VTR wherein a tape wrapped around a drum including a rotary head is transported to form video tracks on the tape which are diagonal with respect to the longitudinal direction of the tape. The helical-scan VTR is widely used by consumers, industry and by professionals in broadcasting stations. In the helical-scan VTR, the video signal of one or more fields is recorded on a video track, and the rotary head is rotated in synchronization with a vertical synchronizing signal for the input video signal to be recorded.

In case where the video signal of one field is recorded on one video track, the rotation of the rotary head is so controlled that the vertical blanking portion of a television signal is recorded at the end portions of each video track (the margin of the tape). Such control is accomplished by phase comparison between a tachometer signal representing the rotating phase of the rotary head and the vertical synchronizing signal of the input video signal. Accordingly, the vertical synchronizing signal for the input video signal maintains a predetermined phase relationship with the tachometer signal in the record mode.

For reproducing the recorded video signal at normal speed, the rotary head is controlled so as to rotate at predetermined rotational speed (revolutions per minute) in synchronization with the synchronizing signal being supplied from the sync signal generator or other reference signals. One conventional way to achieve this result is that the running phase of the tape is controlled by, for instance, the rotation of the tape driving capstan so that the rotary head follows the center of a video track (achieves "tracking").

In special-motion effects reproduction wherein only the tape transport speed is varied from the normal tape speed (at which the video signal was recorded) to produce a special motion effect, the rotary head scans the tape in a path different from the recorded video track. In tape stop mode, the rotary head which started scanning in the vicinity of one end (for example, lower end) of the tape and which was in perfect alignment with a video track would find itself scanning the adjacent video track when it reached the vicinity of the other end (for example, the upper end) of the tape. Therefore, the rotary head scanning a specific video track will gradually depart from the track until it begins to scan the adjacent track.

The signal pattern on a tape recorded with a helical scan VTR is usually such that a guard band is provided between video tracks, with the width ratio of video track to guard band being about 2:1. Therefore, as the rotary head gradually loses alignment with a track, the S/N ratio of video signal decreases and as long as the head is scanning two tracks at the same time, a beat interference occurs, resulting in considerably deteriorated video quality. When the tape in the stop mode is caused to run slowly in forward direction (normal transport direction) or reverse direction, a slow motion effect is produced in the video scene according to the tape transport speed, but in this case, too, the rotary head loses tracking, and a video band containing noise or beat interference will appear in the picture and will move upward or downward depending on the tape transport speed.

To eliminate such undesired deterioration of the picture being reproduced in the special motion modes, automatic scanning systems have been proposed. In such automatic scanning systems, as described, for example, in the U.S. Pat. Nos. 4,080,636, 4,093,885, 49,099,211, and 4,106,065, the rotary head is mounted on a deflectable end portion of a piezoelectric bimorph and is deflected perpendicular to the video track, i.e., to the rotating direction of the rotary head so that it will not lose alignment with the track. However, such automatic scanning systems have complicated video head deflection apparatus for deflecting the rotary head.

SUMMARY OF THE INVENTION

It is, therefore, an object of this invention to provide a video head deflection apparatus with a simplified mechanism for deflecting a rotary video head perpendicular to the rotating direction of the head.

According to this invention, there is provided a video head deflection apparatus for deflecting the rotary head means of a helical scan video tape player perpendicularly to a rotating direction of said rotary head means, said helical scan video tape player comprising means for controlling the transportation of tape on which a television video signal has been recorded to produce a plurality of parallel video tracks formed diagonally with respect to a lengthwise direction of said tape, drum means for guiding said tape along the periphery of said drum means, rotary head means for scanning said tape being guided along said drum means, said deflection apparatus comprising:

a coil assembly; and a magnetic element disposed face to face with said coil assembly, the relative position between said coil assembly and a magnetic element being changed in response to an electromagnetic force by means of an electric current applied to said coil assembly, said rotary head means being coupled to one of said coil assembly and said magnetic element whereby said rotatable transducer head can be moved perpendicularly to the rotational direction of said rotary head means.

BRIEF DESCRIPTION OF OF THE DRAWINGS

Other features and advantages of this invention will be apparent from the following description of a preferred embodiment of this invention taken in conjunction with the accompanying drawings, wherein.

Figure 1:
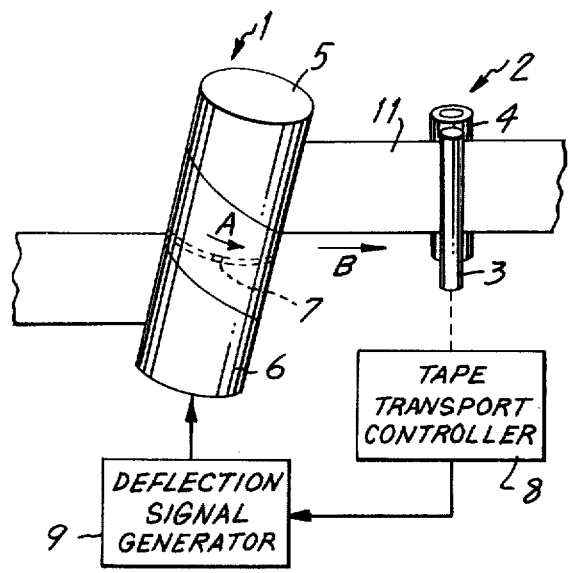
FIG. 1 is a schematic view of a helical scan video tape recorder according to this invention.
Figure 3:
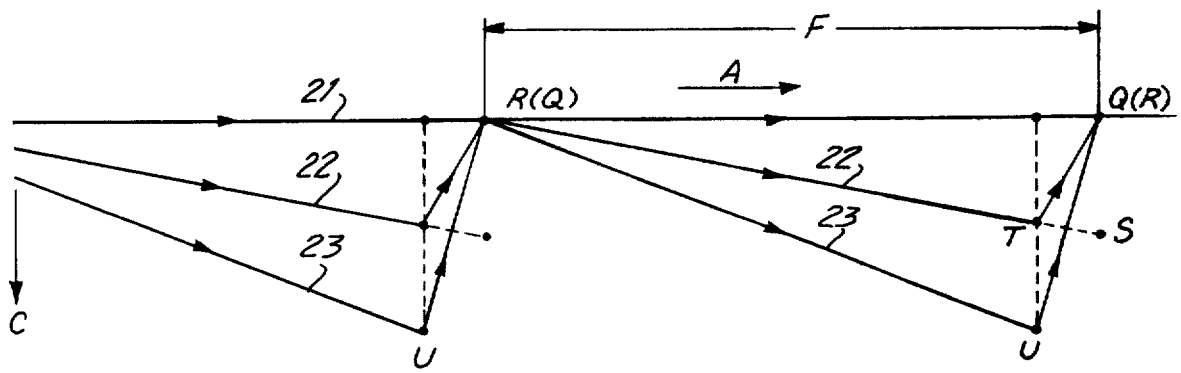
Figure 4:
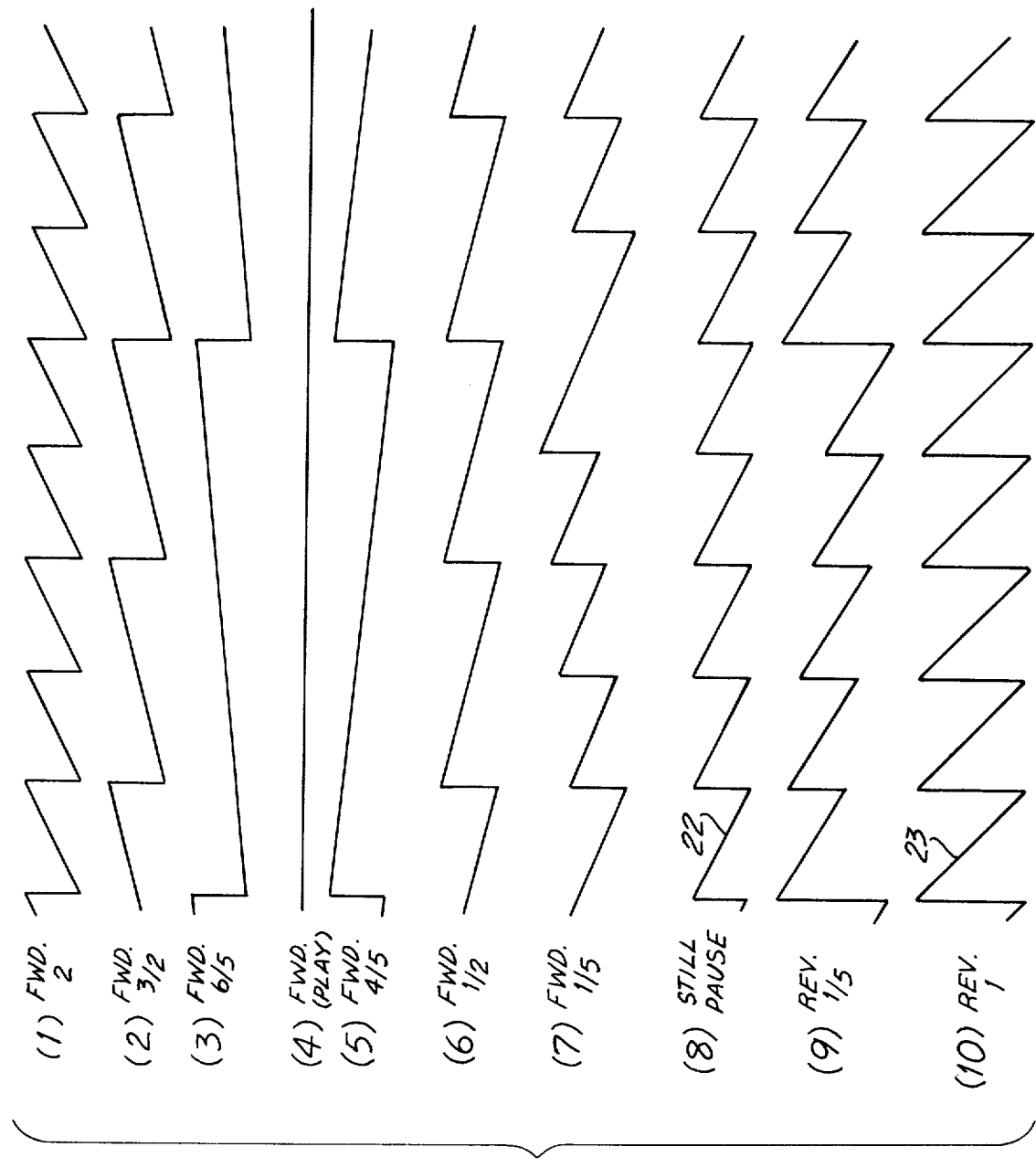
Figure 5:
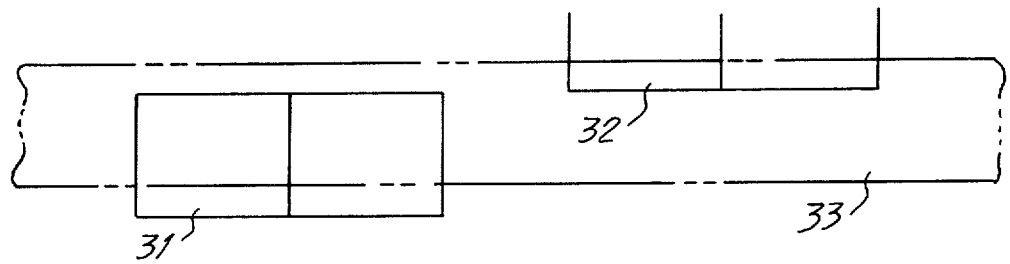
Figure 6:
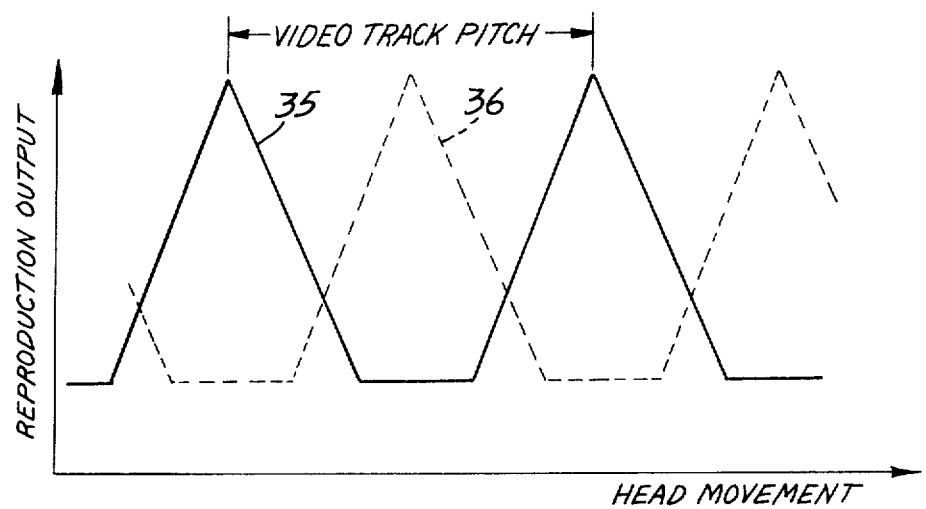
Figure 7:
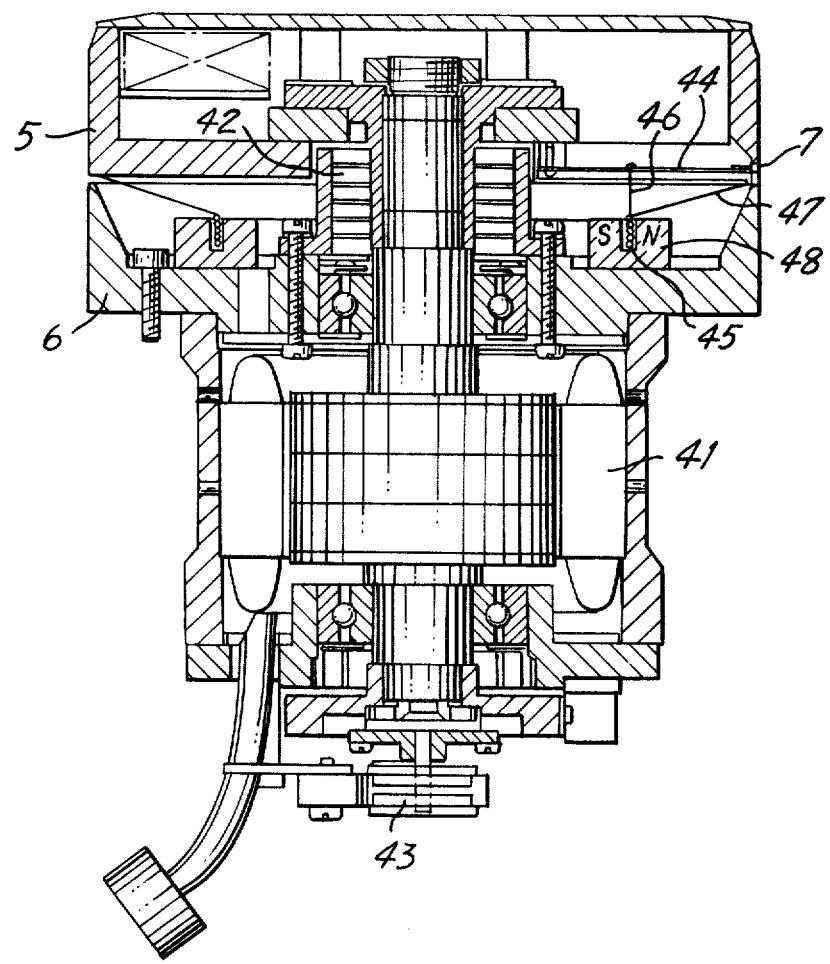

FIGS. 3 and 4(1) to 4(10) show head deflections in special motion reproduction;

FIG. 5 shows the positional relationship between complementary heads and video tracks;

FIG. 6 shows head movement vs. reproduction output characteristics of the complementary head assembly; and FIG. 7 is a cross sectional view of guide drum means employed in the helical scan VTR shown in FIG. 1.

DESCRIPTION OF THE PREFERRED EMBODIMENTS

In the following description of the embodiment of this invention, each of video tracks is assumed to contain the television video signal of one field period. It is apparent that the scope of this invention is not limited to such a case. Further, for clarity of illustration, only the video head deflection apparatus will be described in detail.

Figure 2:
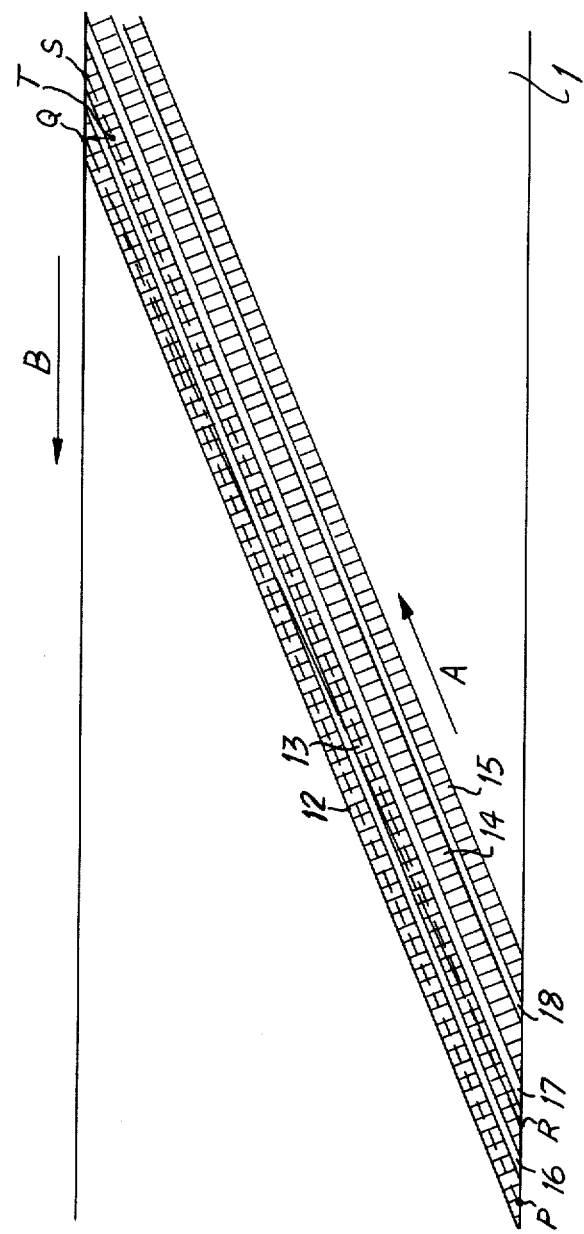
FIG. 2 is a video track format of a tape on which a television video signal is recorded by a helical scan video tape recorder.

Referring to FIG. 1, a magnetic tape 11 is wrapped around a guide drum 1 and transported by tape transporting means 2 consisting of a capstan 3 and a pinch roller 4 in the direction of the arrow B. The guide drum 1 has portions 5 and 6. In guide drum 1, i.e., between drum portions 5 and 6, there is provided a rotary magnetic head 7 rotating in the direction of the arrow A at the vertical scanning rate, whereby a plurality of video tracks 12, 13, 14, 15 each containing video information of one field period are formed diagonally with respect to the longitudinal direction of the tape 11, as shown in FIG. 2. The actual magnetic tape also contains a plurality of other tracks (audio track, control track, and cue track) formed parallel to the lengthwise direction of tape 11, but these are omitted for simplicity.

When magnetic tape 11 is transported for play back at a speed equal to normal transport speed as attained in record mode, rotary head 7 achieves perfect tracking of the video track. The center of rotary head 7 which starts scanning at a point P on video track 12 scans track 12 while depicting the path indicated by the dashed line PQ and ends the scanning at a point Q on the same video track 12. Since magnetic tape 11 moves by one pitch of video track in the period of one scan, rotary head 7 passes the point Q almost concurrently with the next rotary head (for 2-head system) or the same head (for 1-head system) passing a point R on the adjacent video track 13. In the next period of scanning, rotary head 7 scans video track 13 from point R to point S depicting the path shown by the dashed line RS. Thus, the magnetic head 7 achieves perfect tracking of the video track in normal tape transportation.

When the tape is brought to stop under the control of tape transport controller 8 (FIG. 1) and the rotation of rotary head 7 is maintained at the predetermined rate, i.e., at the vertical scanning rate. Rotary head 7 positioned at the point R on the video track 13 at the beginning of scanning will scan toward a point Q on video track 12 ahead of track 13 while depicting the path shown by the long and short dashed line RQ. Because magnetic tape 11 is stopped, rotary head 7 repeatedly scans the same portion of the tape while depicting the path indicated line RQ. Therefore, rotary head 7 which has started scanning the center of track 13 at point R gradually loses alignment with the track and shifts toward the adjacent track 12 until it comes to scan the center of said adjacent track at point Q. To achieve perfect tracking in the tape stop mode, the magnetic head positioned at point R at the beginning of scanning must scan toward point S. However, since points R and Q are equivalent points on the video track, it is necessary that the rotary head scanning video track 13 be deflected to point Q from point T before it reaches point S.

FIG. 3 illustrates the deflection of the rotary 7 head with reference to the plane of its rotation wherein the arrow C indicates the vertical direction and the amount of the head deflection. When rotary head 7 is not deflected perpendicularly to the video track, the head depicts a plane of rotation 21, with the distance F between points R and Q being the rotating cycle of the head (one field), or stated more accurately, the cycle in which the head scans one video track. Let us assume that in still reproduction mode, when the rotating head which strated scanning at point R accurately scans video track 13 and returns to point Q via point T, head 7 depicts a saw-toothed path 22 as indicated by R-T-Q in FIG. 2. In order that the head scan the video track accurately when the tape is transported in the reverse direction at normal speed under the control of tape transport controller 8 (FIG. 1), head 7 must travel a saw-toothed path 23 R-U-Q.

In slow motion reproduction, in a forward or reverse direction under control of controller 8, the head 7 must travel paths of complex shape such as that, illustrated in FIG. 4. The paths vary with the tape transport speed. FIG. 4(4) shows head deflection in the case of the normal reproduction in which tape 11 is transported in direction B at normal tape speed $S_N$, and corresponds to the path 21 of FIG. 3. In this case, as understood from FIG. 4(4), rotary head 7 is not deflected.

FIGS. 4(8) and 4(10) correspond respectively to paths 22 and 23, i.e., show head deflection in cases of the tape-stop mode and reverse reproduction at the normal speed $S_N$.

FIG. 4(1), 4(2) and 4(3) show the head deflections in cases of quick forward motion reproduction at tape speeds of $2S_N$, $1.5S_N$ and $1.2S_N$, respectively, FIGS. 4(5), 4(6) and 4(7) in cases of forward slow motion reproduction at tape speeds of $0.8S_N$, and $0.2S_N$, respectively, and FIGS. 4(9) and 4(10) in cases of reverse reproduction at the tape speeds of $0.2S_N$ and $S_N$, respectively.

As the rotary head moves from the apex of each of these saw-toothed paths (e.g. points T' and U') to point R', it will not of course trace the video track. Therefore, the head desirably accomplishes such movement within the vertical blanking period for the recorded video signal. The saw-toothed paths are computer-programmable on the basis of the tape transport speed of which they are a function.

The foregoing description has assumed that the rotary head starts the scanning of a video track at point R or the center of the video track, but this is not so in most practical applications. Accordingly, under a program incorporating the saw-toothed paths to be traced by the rotary head, the head will depict a scanning path on the tape parallel to the video track. In this case, a complementary head assembly (twin heads) may be used to establish tracking between the reproduce head and video track.

FIG. 5 shows the positions of twin heads 31 and 32 which are located, as shown, relative to a video track 33 and the adjacent track 34. In FIG. 5, most of head 31 rests on video track 33, whereas head 32 rests on both tracks 33 and 34. The video signal is derived from head 31 in the illustrated embodiment. If the pair of heads shifts upwardly with respect to the video track, head 31 will trace track 33 accurately, thus providing increased reproduction output which peaks and declines afterward. Head 32 gradually shifts to video track 34 and when it has occupied a substantial part of the track, it provides the same reproduction output as head 31 does. The amplitude of the signal reproduced by a video head is generally proportional to the width of the video track on which the head rests. The case where the video head makes linear and vertical movements with respect to the video track, video heads 31 and 32 provide reproduction outputs as shown in FIG. 6. In FIG. 6, lines 35 and 36 represent the reproduction output by heads 31 and 32, respectively.

By deriving a video signal from a selected twin head providing a larger reproduction output, the head will achieve near-perfect tracking irrespective of its position so long as it depicts a scanning path on the tape that is parallel to the video track. Therefore, no beats will be produced in the picture being reproduced. With the video track being twice as wide as the guard band as shown in FIG. 5, an accurately tracking head will deliver a reproduction output which is about 6 dB greater than the output produced immediately before switching between the heads. The 6 dB level difference produces about a 2 dB drop in the S/N ratio, but this is insignificant in practical applications.

Referring to FIG. 7, guide drum means 1 comprises upper drum 5, lower drum 6, rotary head 7 (complementary head assembly consisting of twin heads 31 and 32), a motor 41 for driving rotary head 7, rotary transformer means 42 for electrically coupling rotary head 7 to recording and reproducing amplifiers (not shown) of the helical scan VTR, and a slip-ring means 43 for supplying the deflection signal from a deflection signal generator 9 (FIG. 1).

Rotary head 41 slightly projects from upper drum 5 to make contact with the tape. The tape is transported and is wrapped around the cylinder formed of upper and lower drums 5 and 6. Rotary head 7 is supported by a leaf spring 44. A coil 45 which is configured as a thin cylinder coaxial with the revolving shaft of the rotary head 7 and drives, by means of a piano wire 46 and leaf spring 44, rotary head 7 perpendicularly with respect to the direction of rotation of rotary head 7. The coil 45 is supported on upper drum 5 by means of a cone 47. A magnet 48 is cylindrical and has a slit for accommodating coil 45 and which is magnetized as shown in FIG. 7. Therefore, coil 45 rotates with rotary head 7, but magnet 48 is fixed to lower drum 6.

Referring back to FIG. 1, tape transport controller 8 supplies the tape speed information (including the tape speed and transporting direction) to deflection signal generator 9. Deflection signal generator 9 generates the deflection signals of saw-tooth waves, as shown in FIG. 4, in response to the tape speed information. The deflection signals are applied through slip ring means 43 to coil 45 (FIG. 7), whereby an electromagnetic force is generated between coil 45 and magnet 48 to drive rotary head 7 vertically with respect to the video track, or the plane of rotation of rotary head 7.

A similar result is obtained in a modification wherein a thin cylinder of magnet or mild steel rather than coil 48 is mounted on upper drum 5 and an electromagnet rather than magnet 48 is fixed to lower drum 6. The advantage of this modification is that the rotating member need not be supplied with the deflection signal. It is to be understood that since the driving system for the rotary head 7 that comprises coil 45, cone 47 and leaf spring 44 forms a vibrating system, the cone need be made of rubber or rubber-impregnated paper to thereby achieve satisfactory damping of possible vibrations.

What is claimed is:

1. A video head deflection apparatus for a helical scan video tape deck, said helical scan video tape deck comprising means for controlling the transportation of a tape on which a video signal has been recorded to produce a plurality of parallel video tracks formed diagonally with respect to the lengthwise direction of said tape, guide drum means for guiding said tape along the periphery thereof, said guide drum means comprising upper and lower drums, rotary head means provided between said upper and lower drums and rotating at a predetermined rotational speed, said rotary head means including a revolving shaft and at least one magnetic head for scanning said tape being guided along said drum for scanning said tape being guided along said drum means, and driving means arranged coaxially with said revolving shaft of said rotary head means for causing the rotation of said rotary head means, said deflection apparatus comprising:

a coil assembly arranged coaxially with said revolving shaft of said rotary head means; and a magnetic element arranged coaxially with said revolving shaft of said rotary head means and in opposed relationship with said coil assembly, the relative position between said coil assembly and said magnetic element being changed in response to an electromagnetic force by an electric current applied to said coil assembly, said rotary head means being coupled to one of said coil assembly and said magnetic element, whereby said rotary head is displaced in a direction normal to the rotational path of said rotary head means.

2. The deflection apparatus as claimed in claim 1, wherein said rotary head means include first and second video read/write heads.

3. The deflection apparatus as claimed in claim 1, wherein said rotary head means are coupled to spring means to permit said head means to be displaced.

4. The deflection apparatus as claimed in claim 3 wherein said spring means including a leaf spring, one end of said leaf spring mounting said at least one magnetic head, the other end of said leaf spring being fixed to a portion of said rotary head means.

5. The deflection apparatus of claim 4, further comprising a cone arranged coaxially with said revolving shaft of said rotary head means for supporting said coil assembly on said rotary head means, and wire means for coupling said coil assembly to said leaf spring.

6. The deflection apparatus as claimed in claim 1, wherein said transportation controlling means include output means to output a signal representing the speed at which said tape is transported, a deflection signal generator having an input coupled to the output signal of said transportation controlling means, said deflection signal generator having an output coupled to said coil, said deflection signal generator outputting said electrical current to said coil to deflect said rotary head, said electrical current being dependent on the signal input to said generator in a predetermined manner.

7. The deflection apparatus as claimed in claim 1, wherein said magnetic element comprises a permanent magnet.

* * * * *